United States Patent
Feng et al.

(10) Patent No.: US 10,162,684 B2
(45) Date of Patent: Dec. 25, 2018

(54) CPU RESOURCE MANAGEMENT IN COMPUTER CLUSTER

(71) Applicant: International Business Machines Corporation, Armonk, NY (US)

(72) Inventors: Kuan Feng, Thornhill (CA); Fan Jie Meng, Shanghai (CN); Heng Ping Xu, Shanghai (CN); Ting Xue, Richmond Hil (CA)

(73) Assignee: International Business Machines Corporation, Armonk, NY (US)

( * ) Notice: Subject to any disclaimer, the term of this patent is extended or adjusted under 35 U.S.C. 154(b) by 165 days.

(21) Appl. No.: 14/883,704

(22) Filed: Oct. 15, 2015

(65) Prior Publication Data
US 2017/0109204 A1  Apr. 20, 2017

(51) Int. Cl.
G06F 9/46 (2006.01)
G06F 9/50 (2006.01)

(52) U.S. Cl.
CPC .......... G06F 9/5083 (2013.01); G06F 9/5061 (2013.01); *G06F 2209/5012* (2013.01)

(58) Field of Classification Search
USPC ........................................................ 718/104
See application file for complete search history.

(56) References Cited

U.S. PATENT DOCUMENTS

| | | | |
|---|---|---|---|
| 8,336,054 B2 * | 12/2012 | Cherkasova | G06F 9/4881 709/226 |
| 8,392,928 B1 * | 3/2013 | Forys | G06F 9/5061 718/104 |
| 8,640,137 B1 | 1/2014 | Bostic et al. | |
| 8,694,637 B1 | 4/2014 | Beloussov et al. | |
| 8,918,784 B1 | 12/2014 | Jorgensen et al. | |
| 9,081,623 B1 * | 7/2015 | Magerramov | G06F 9/50 |
| 2005/0108714 A1 * | 5/2005 | Geye | G06F 9/5033 718/100 |
| 2006/0195715 A1 * | 8/2006 | Herington | G06F 9/5077 714/4.2 |
| 2006/0265470 A1 * | 11/2006 | Rolia | G06F 9/5027 709/217 |
| 2007/0234365 A1 * | 10/2007 | Savit | G06F 9/505 718/104 |
| 2008/0022284 A1 * | 1/2008 | Cherkasova | G06F 9/4881 718/104 |
| 2009/0055823 A1 * | 2/2009 | Zink | G06F 11/3419 718/100 |

(Continued)

OTHER PUBLICATIONS

Bartolini et al., "Automated Fine-Grained CPU Provisioning for Virtual Machines", ACM Transactions on Architecture and Code Optimization, vol. 11, No. 3, Article 27, Publication date: Jul. 2014, pp. 1-25.

(Continued)

*Primary Examiner* — Mehran Kamran
(74) *Attorney, Agent, or Firm* — Gilbert Harmon, Jr.

(57) ABSTRACT

Embodiments of the present invention relate to CPU resource management in a computer cluster. A master node selects a CPU core of at least one compute node for an application from a computer cluster, and allocates a portion of resource of the CPU core to the application. The master node re-allocates a new portion of the resource of the CPU core to the application, in response to a trigger event for re-allocation.

15 Claims, 5 Drawing Sheets

(56) References Cited

U.S. PATENT DOCUMENTS

| | | | | |
|---|---|---|---|---|
| 2009/0276771 | A1* | 11/2009 | Nickolov | G06F 9/4856 717/177 |
| 2010/0312873 | A1* | 12/2010 | Loboz | G06Q 10/06393 709/224 |
| 2011/0161965 | A1* | 6/2011 | Im | G06F 9/5038 718/102 |
| 2011/0179162 | A1* | 7/2011 | Mayo | G06F 9/5077 709/224 |
| 2012/0054766 | A1* | 3/2012 | de Dinechin | G06F 9/5088 718/104 |
| 2012/0192152 | A1* | 7/2012 | Oberlin | G06F 9/5055 717/121 |
| 2013/0332926 | A1 | 12/2013 | Jakoljevic et al. | |
| 2014/0040474 | A1* | 2/2014 | Blagodurov | G06F 9/5088 709/226 |
| 2014/0173616 | A1* | 6/2014 | Bird | G06F 9/50 718/104 |
| 2014/0173623 | A1* | 6/2014 | Chang | G06F 9/5088 718/105 |
| 2014/0181834 | A1* | 6/2014 | Lim | G06F 9/5088 718/105 |
| 2014/0244844 | A1* | 8/2014 | Minakuchi | G06F 9/5083 709/226 |
| 2015/0026336 | A1* | 1/2015 | Suchter | G06F 9/5038 709/224 |
| 2015/0250076 | A1* | 9/2015 | Kondo | H05K 7/20836 361/679.48 |
| 2015/0256485 | A1* | 9/2015 | Bone | G06F 9/5044 709/226 |
| 2016/0062867 | A1* | 3/2016 | Rodriguez | G06F 11/3428 702/186 |
| 2016/0154676 | A1* | 6/2016 | Wen | G06F 9/50 718/1 |

OTHER PUBLICATIONS

Han et al., "Lightweight Resource Scaling for Cloud Applications", 2012 12th IEEE/ACM International Symposium on Cluster, Cloud and Grid Computing, © 2012 IEEE, DOI 10.1109/CCGrid.2012.52, pp. 644-651.

"5725-G86 IBM Platform Symphony V7.1", IBM, released on Dec. 5, 2014, pp. 1-7, Grace Period Disclosure, <http://www-01.ibm.com/common/ssi/printableversion.wss?docURL=/common/ssi/rep_sm/6/877/ENUS5725-G86/index.html>.

* cited by examiner

US 10,162,684 B2

CPU RESOURCE MANAGEMENT IN COMPUTER CLUSTER

STATEMENT REGARDING PRIOR DISCLOSURES BY THE INVENTOR OR A JOINT INVENTOR

The following disclosure(s) are submitted under 35 U.S.C. 102(b)(1)(A) as prior disclosures by, or on behalf of, a sole inventor of the present application or a joint inventor of the present application:

1) Incorporated into International Business Machines' Platform Symphony version 7.1, released on Dec. 5, 2014.

BACKGROUND OF THE INVENTION

The present invention relates generally to a computer cluster, and more specifically, to central processing unit (CPU) resource management in a computer cluster.

With rapid growth in the volume of data and applications, the demands on CPU(s) for processing information is constantly increasing. A workload manager or scheduler plays an essential role in distributed computing systems such as a cluster or cloud computing system. The workload manager manages all computer hosts as a whole and dispatches tasks to certain hosts based on pre-defined rules to balance the workload.

SUMMARY

According to one embodiment of the present invention, a computer-implemented method for allocating computer resources, the computer-implemented method comprising: selecting, by a master node, a CPU core of at least one computer node from a computer cluster, for an application; allocating, by the master node, a portion of a resource of the CPU core to the application; and in response to receiving, by the master node, a trigger event for re-allocation, re-allocating, by the master node, the portion of the resource of the CPU core to the application.

According to another embodiment of the present invention, a system comprising: one or more processors; a memory coupled to at least one of the processors; a set of computer program instructions stored in the memory and executed by at least one of the processors in order to perform actions of: selecting a CPU core of at least one computer node from a computer cluster for an application; allocating a portion of a resource of the CPU core to the application; and in response to a trigger event for re-allocation, re-allocating the portion of the resource of the CPU core to the application.

According to another embodiment of the present invention, a computer program product, comprising a computer readable storage medium having program instructions embodied thereon, the program instructions executable by a master node to cause the master node to: select a CPU core of at least one compute node from a computer cluster for an application; allocate a portion of a resource of the CPU core to the application; and in response to a trigger event for re-allocation, re-allocate the portion of the resource of the CPU core to the application.

BRIEF DESCRIPTION OF THE DRAWINGS

Through a more detailed description of some of the embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
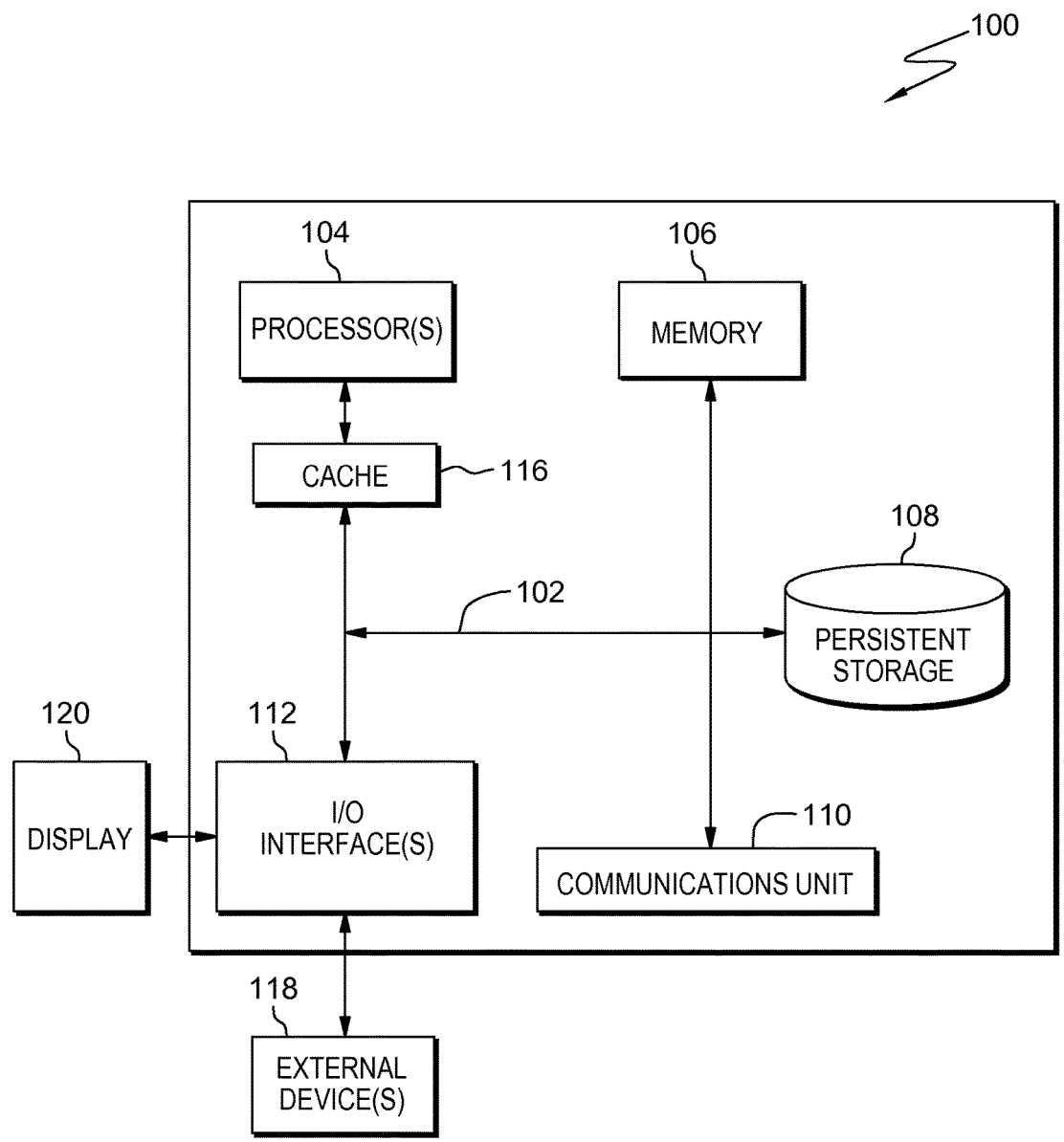
FIG. 1 shows an exemplary computer system which is applicable to implement the embodiments of the present invention.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Well managed CPU resource is critical for reducing the time required for obtaining a result in high performance technical computing, analytics and big data applications deployed on clusters, grids and clouds. The general practice is to manage a cluster at a CPU core level, as it is hard to enforce the CPU usage at a sub-core level. For example, Virtual Machine technology itself is heavy at the sub-core level. However, CPU core level is too coarse for lightweight workloads which demand less than one CPU core. For example, online shopping applications are always online, but only work several minutes or hours in a day. This will cause CPU resource waste. Further, the CPU utilization is not always constant even for a single workload, and thus users pay extra money for idle CPU time. Accordingly, the allocated resources for workloads should be adjusted dynamically based on actual utilization.

Linux control groups technology, also known as Cgroups, provides basic functionality to enforce CPU usage on a host basis. However, it does not take into account the fact that different hosts in a cluster may have different CPU architectures and thus different capabilities. As a result, it fails to involve cross host unification and generalization with respect to CPU capability. Therefore, Cluster/Cloud level unification and orchestration is required.

This disclosure introduces a fine-grained CPU resource management system. It enables the customer of the system to unify the computing capability of each computer host easily, orchestrate the CPU resources in the cluster at sub-core level, ensure an application on each host does not exceed the ceiling of resource defined for the application and adjust CPU resources dynamically based on usage of the application. As such, the customer of the system can deploy one or more applications to the cluster and allocate CPU resources in sub-core level, saving costs by avoiding paying extra money for idle CPU time and improving the computing capacity of the cluster.

As used herein, the term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

FIG. 1 depicts computer system 100, an example computer system representative of server a computer. Computer system 100 includes communications fabric 102, which provides communications between computer processor(s) 104, memory 106, persistent storage 108, communications unit 110, and input/output (I/O) interface(s) 112. Communications fabric 102 can be implemented with any architecture designed for passing data and/or control information between processors (such as microprocessors, communications and network processors, etc.), system memory, peripheral devices, and any other hardware components within a system. For example, communications fabric 102 can be implemented with one or more buses.

Computer system 100 includes processors 104, cache 116, memory 106, persistent storage 108, communications unit 110, input/output (I/O) interface(s) 112 and communications fabric 102. Communications fabric 102 provides communications between cache 116, memory 106, persistent storage 108, communications unit 110, and input/output (I/O) interface(s) 112. Communications fabric 102 can be implemented with any architecture designed for passing data and/or control information between processors (such as microprocessors, communications and network processors, etc.), system memory, peripheral devices, and any other hardware components within a system. For example, communications fabric 102 can be implemented with one or more buses or a crossbar switch.

Memory 106 and persistent storage 108 are computer readable storage media. In this embodiment, memory 106 includes random access memory (RAM). In general, memory 106 can include any suitable volatile or non-volatile computer readable storage media. Cache 116 is a fast memory that enhances the performance of processors 104 by holding recently accessed data, and data near recently accessed data, from memory 106.

Program instructions and data used to practice embodiments of the present invention may be stored in persistent storage 108 and in memory 106 for execution by one or more of the respective processors 104 via cache 116. In an embodiment, persistent storage 108 includes a magnetic hard disk drive. Alternatively, or in addition to a magnetic hard disk drive, persistent storage 108 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 108 may also be removable. For example, a removable hard drive may be used for persistent storage 108. Other examples include optical and magnetic disks, thumb drives, and smart cards that are inserted into a drive for transfer onto another computer readable storage medium that is also part of persistent storage 108.

Communications unit 110, in these examples, provides for communications with other data processing systems or devices. In these examples, communications unit 110 includes one or more network interface cards. Communications unit 110 may provide communications through the use of either or both physical and wireless communications links. Program instructions and data used to practice embodiments of the present invention may be downloaded to persistent storage 108 through communications unit 110.

I/O interface(s) 112 allows for input and output of data with other devices that may be connected to each computer system. For example, I/O interface 112 may provide a connection to external devices 118 such as a keyboard, keypad, a touch screen, and/or some other suitable input device. External devices 118 can also include portable computer readable storage media such as, for example, thumb drives, portable optical or magnetic disks, and memory cards. Software and data used to practice embodiments of the present invention can be stored on such portable computer readable storage media and can be loaded onto persistent storage 108 via I/O interface(s) 112. I/O interface(s) 112 also connect to display 120.

Display 120 provides a mechanism to display data to a user and may be, for example, a computer monitor.

Figure 2:
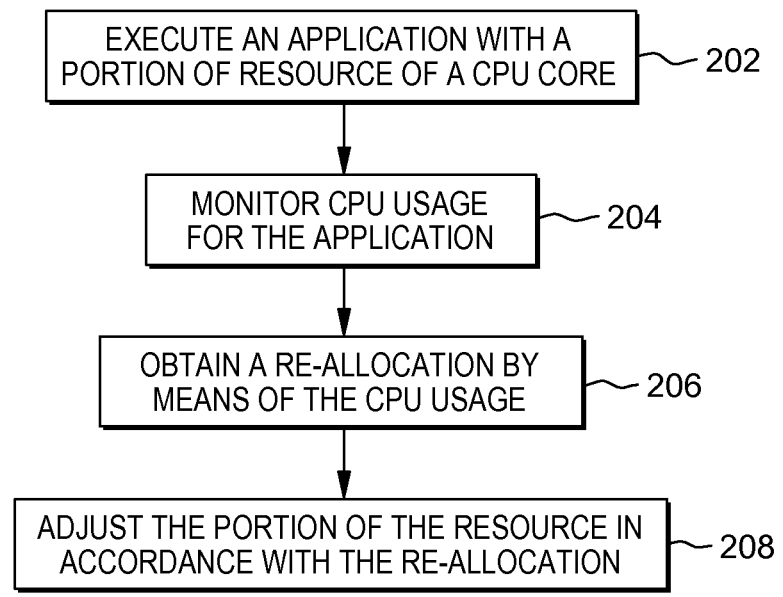
FIG. 2 is a flow chart showing a method for execution on a compute node, in accordance with an embodiment of the present invention.

FIG. 2 is a flow chart showing a method for execution on a compute node according to an embodiment of the present invention. Optionally, before step 202 of FIG. 2 is executed, a computer node can determine a CPU capability of its CPU core(s), and send the CPU capability to a master node of a computer cluster. In regard to the computer cluster, it may comprise the master node and a computer node or nodes which can be connected to each other through a network. The master node and the computer node(s) can be any computers with the same or different hardware configurations, and can be generally, for example, commercially available computers. The network can be any high speed network, and can be generally, for example, a fast local area network (LAN).

The master node and the computer node(s) can communicate with each other and work together to act as a single system. The master node can coordinate the activities of the computer nodes. For example, the master node can divide a job into smaller jobs and dispatch these smaller jobs to one or more computer nodes for execution. After having dispatched a job to one computer node, the master node can decide to migrate the job from the one computer node to another computer node in order to achieve load balancing among the computer nodes. The technologies for achieving the above functions can include, but not limited to, a Linux cluster, a Windows Server, a Unix cluster, etc.

In regard to the above determination of the CPU capability, for a homogeneous CPU, the capability of the single core can be determined and sent to the master node, and for a heterogeneous CPU, the capabilities of all cores can be determined and sent to the master node. For example, when the cluster is set up (i.e., the computer node is an original member of the cluster) or the computer node is newly added into the cluster, the computer node can execute a benchmark program on its CPU core, measure at least one parameter for the benchmark program, and use the at least one parameter to calculate a rating as to the CPU capability of its CPU core. As an example, the computer node can measure the time required for execution of the benchmark program by the computer node, and obtain a rating of the capability of the computer node by dividing a reference time by the time required by the computer node. The reference time can be the time required for execution of the same benchmark program by a reference CPU, and can be determined for example before the cluster is set up, and sent to the computer node while the cluster is set up or when the computer node is added into the cluster.

The benchmark program can be any kind of benchmark program capable of determining a CPU capability of a CPU core, and one or more kinds of benchmark programs can be used. For example, System Performance Evaluation Cooperation (SPEC) benchmark programs can be used. In a case where a set of benchmark programs are executed on a computer node, a set of reference time values for respective benchmark programs can be sent to the computer node to calculate a set of ratings for respective benchmark programs. Then, for example, a geometric mean of this set of ratings can be taken as the capability of the computer node. As such, in a cluster having computer nodes with different CPU architectures, the capability of each computer node can be evaluated in a unified manner.

Further, in step 202, the computer node can execute an application with a portion of resource of a CPU core allocated by the master node. The application can be, for example, a job dispatched by the master node. Since the master node can divide a job into smaller jobs and dispatch these smaller jobs to one or more computer nodes, one application having a plurality of instances can be dispatched to more than one computer node. Thus, the term "application" in the present disclosure can refer to at least one instance of an application.

The portion of the resource of the CPU core can be allocated to the application by the master node by, for example, determining a maximum limit of CPU core usage for the application and sending the maximum limit to the computer node when the application is dispatched as a job to the computer node. In this case, executing the application with the allocated portion of the resource can be implemented by executing the application within the maximum limit of the CPU core usage. As an example, the execution within the maximum limit of the CPU core usage can be implemented by using, for example, Linux Cgroup technology. Cgroup (abbreviated from control group) is a Linux kernel feature that limits, accounts for and isolates the resource usage (CPU, memory, disk I/O, network, etc.) of a collection of processes. The main terms used in Cgroup technology are tasks, control group, subsystem and hierarchy. A task can be a process in a system. A Cgroup can associate a set of tasks with a set of parameters for one or more subsystems. A subsystem can be a module that makes use of the task grouping facilities provided by Cgroups to treat groups of tasks in particular ways. A hierarchy can be a set of Cgroups arranged in a tree, such that every task in the system is in exactly one of the Cgroups in the hierarchy, and a set of subsystems.

Subsystems of Cgroup technology are typically resource controllers that allocate varying levels of system resources to different Cgroups. The cpu subsystem is one of the subsystems, and schedules CPU access to Cgroups. In the cpu subsystem, access to CPU resources can be scheduled using two schedulers i.e., Completely Fair Scheduler (CFS) and Real-Time scheduler (RT). The CFS is a proportional share scheduler which divides the CPU time (CPU bandwidth) proportionately between groups of tasks (Cgroups) depending on the priority/weight of the task or shares assigned to Cgroups. The RT scheduler is a task scheduler that provides a way to specify the amount of CPU time that real-time tasks can use.

In CFS, a Cgroup can get more than its share of CPU if there are enough idle CPU cycles available in the system, due to the work conserving nature of the scheduler. Ceiling enforcement can be used for cases when a hard limit on the amount of CPU that a Cgroup can utilize is required (that is, tasks cannot use more than a set amount of CPU time). The ceiling enforcement tunable parameters comprise cpu.cfs_period_us (μs, represented here as "us") and cpu.cfs_quota_us. Cpu.cfs_period_us specifies a period of time in microseconds for how regularly a Cgroup's access to CPU resources should be reallocated. Cpu.cfs_quota_us specifies the total amount of time in microseconds for which all tasks in a Cgroup can run during one period (as defined by cpu.cfs_period_us). As soon as tasks in a Cgroup use up all the time determined by the quota, they are throttled for the remainder of the time determined by the period and not allowed to run until the next period. For example, if tasks in a Cgroup should be able to access a single CPU for 0.2 seconds out of every 1 second, cpu.cfs_quota_us may be set to 200000 and cpu.cfs_period_us may be set to 1000000. The upper limit of the cpu.cfs_quota_us parameter is 1 second and the lower limit is 1000 microseconds. As such, by use of these two parameters, the maximum limit of CPU core usage for the application can be enforced. It should be noted that the present disclosure is not limited to the above Cgroup solutions in the Linux system, and any other technologies with the ceiling enforcement capability can be used instead.

Further, in Cgroup technology, the cpuset subsystem is another one of the subsystems, and can assign individual CPUs and memory nodes to Cgroups. In the cpuset subsystem, the parameter cpuset.cpus specifies the CPUs that tasks in a Cgroup are permitted to access. This parameter can be used to assign each single core in a heterogeneous CPU to the benchmark program in the above optional step for determining the CPU capability. Likewise, the present disclosure is not limited to Cgroup solutions in Linux system, and any other technologies with the CPU core assignment capability may be used instead.

Continuing, in step 204, the computer node can monitor CPU core usage for the application. For example, the CPU core usage can be monitored regularly (e.g., in a period of a second or more frequently). Then, in step 206, the computer node can obtain a re-allocation from the master node based on the monitored CPU core usage for the application. As one example, the re-allocation can be obtained from the master node by sending a CPU core resource adjustment request to the master node, in response to the monitored CPU core usage for the application satisfying a CPU core resource adjustment condition. In this example, the computer node can optionally send the monitored CPU core usage for the application to the master node. The monitored CPU core usage can be, for example, stored locally on the computer node for collection by the master node. For example, the monitored CPU core usage can be sent to the master node regularly or in response to a request from the master node. This example can be implemented as for example in steps 302, 304, 306, 308 and 310 in FIG. 3, which will be described later. As another example, the re-allocation can be obtained from the master node by sending the monitored CPU core usage for the application to the master node such that the master node can check whether the monitored CPU core usage for the application satisfies the CPU core resource adjustment condition.

Then, in step 208, the computer node can adjust the portion of the resource allocated to the application in accordance with the re-allocation. This step can be implemented as for example in steps 312, 314 and 316 in FIG. 3, which will be described later.

Figure 3:
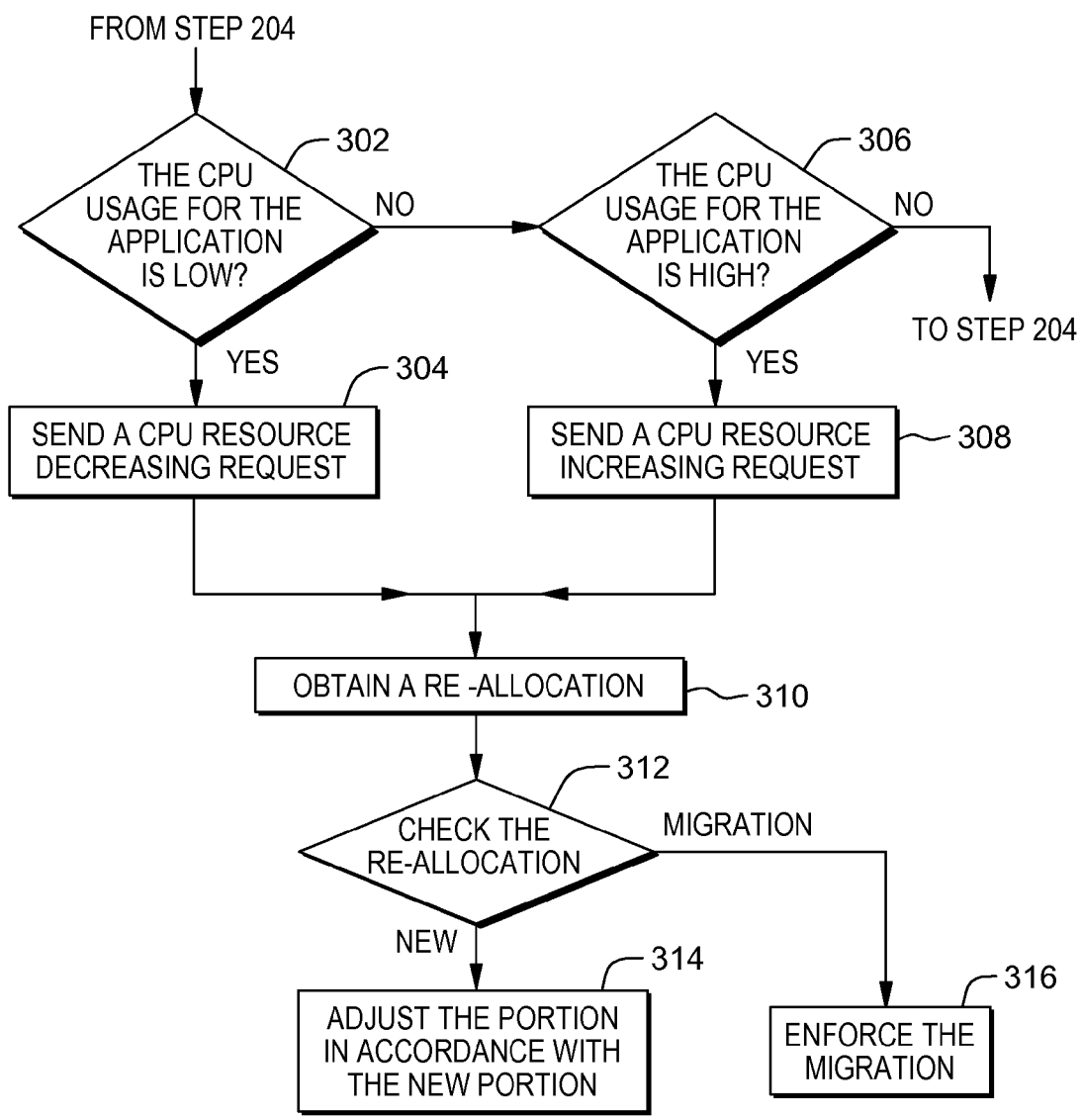
FIG. 3 is a flow chart for explaining the operations in some steps in FIG. 2, in accordance with an embodiment of the present invention.

FIG. 3 is a flow chart for explaining the operations in some steps in FIG. 2. In step 302, the computer node can check whether the monitored CPU core usage for the application is lower than or equal to a first threshold. As an example, the computer node can check whether the CPU core usage for the application is lower than or equal to a first threshold for a first predetermined period. For example, the first threshold may be the current maximum limit of CPU core usage for the application multiplied by a percentage of (100%—a first predetermined ratio—margin percentage), wherein the first predetermined ratio represents a unit for decreasing the maximum limit (e.g., 10%), and the margin percentage may be for example 1%~2%. The first predetermined period can be, for example, on the order of a minute. However, the present disclosure is not so limited, and the first threshold, the first predetermined ratio and the first predetermined period can take any other suitable values depending on the actual conditions.

If the check result in step 302 is positive (i.e., the monitored CPU core usage for the application is less than or equal to the first threshold), the computer node can send a CPU core resource decreasing request to the master node in step 304. The CPU core resource decreasing request can take any suitable form including, but not limited to, an alert, an instruction, etc.

On the other hand, if the check result in step 302 is negative (i.e., the monitored CPU core usage for the application is not less than or equal to the first threshold), the computer node can check whether the CPU core usage for the application is greater than or equal to a second threshold in step 306. As an example, the computer node can check whether the CPU core usage for the application is greater than or equal to a second threshold for a second predetermined period. For example, the second threshold can be the current maximum limit of CPU core usage for the application multiplied by a percentage within a range of [100%−margin percentage, 100%], wherein the margin percentage can be for example 1%~2%. The second predetermined period can be, for example, on the order of a minute. However, the present disclosure is not so limited, and the second threshold and the second predetermined period can take any other suitable values depending on the actual conditions. Alternatively, the second predetermined period can also be different from the first predetermined period in step 302.

If the check result in step 306 is negative (i.e., the CPU core usage for the application is not greater than or equal to the second threshold), the computer node can proceed to step 204 in which the CPU core usage for the application is monitored. On the other hand, if the check result in step 306 is positive (i.e., the CPU core usage for the application is greater than or equal to a second threshold), the computer node can send a CPU core resource increasing request to the master node in step 308. The CPU core resource increasing request can take any suitable form including, but not limited to, an alert, an instruction, etc.

Then, in step 310, the computer node can obtain, from the master node, a re-allocation related to a new portion of the resource of the CPU core. The re-allocation can be obtained in any suitable manner such as, but not limited to, in an instruction, in a message, etc. The re-allocation can either indicate the new portion of the resource (for example the increased or decreased maximum limit of CPU core usage for the application such as the increased or decreased parameter cpu.cfs_quota_us), or indicate migration of the application. In the case of indicating migration of the application, the re-allocation can contain, for example, the identification of the destination CPU core.

Then, in step 312, the computer node can check whether the re-allocation indicates the new portion of the resource, or indicates migration of the application. If the re-allocation indicates the new portion of the resource, the computer node can adjust the portion of the resource in accordance with the new portion of the resource in step 314. For example, the portion of the resource can be decreased or increased by enforcing the decreased or increased maximum limit indicated by the re-allocation, as described with reference to step 202.

On the other hand, if the re-allocation indicates migration of the application, the computer node can enforce the migration in step 316. The migration can be implemented by any process migration algorithms in computer cluster technology such as, but not limited to, Linux cluster, Windows Server, Unix cluster, etc.

Figure 4:
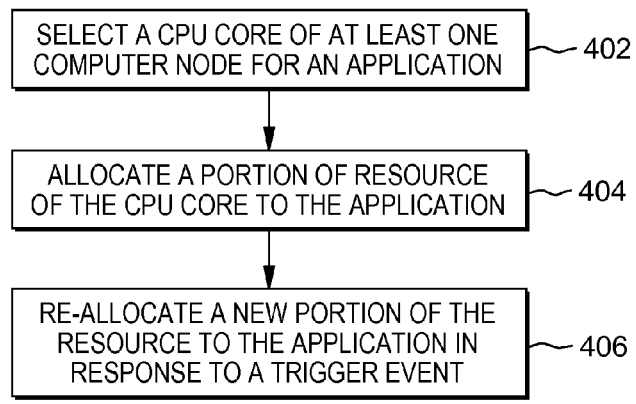
FIG. 4 is a flow chart showing a method for execution on a master node, in accordance with an embodiment of the present invention.

FIG. 4 is a flow chart showing a method for execution on a master node according to an embodiment of the present invention. Optionally, before step 402 of FIG. 4 is executed, a master node can obtain a CPU capability for each CPU core of the computer cluster. The CPU capability for each CPU core can be determined as described with reference to the optional step executed before step 202 in FIG. 2.

In step 402, the master node can select a CPU core of at least one computer node for an application from a computer cluster (for example when the application is started and requests a CPU resource). For example, the selection can be based on the usage required by the application and a policy for the application. If any instances of the same or similar application have been executed on some CPU cores in the past, the usage required by the application can be determined based on the past CPU core usage on these CPU cores. For example, suppose the application has been executed in the past on CPU cores i (i=1, 2, . . . , k) with capability $C_i$, and average usage on the CPU core i for the application in the past is a percentage $U_i$. Then, if the application will be dispatched to a computer node j with capability $C_j$, the usage required by the application may be determined as $$\left(\sum_{i=1}^{k} C_i U_i\right) \Big/ (k C_j).$$

If the application has not been executed in the past, the usage required by the application can be set as a default value or set as desired by a customer of the cluster system. The policy for the application can be set by the customer, and can include for example distributing the application to more or less computer nodes as possible. Further, the selection can be based on the capacity of each CPU core in the cluster, which will be described later with reference to step 510 in FIG. 5.

Then, in step 404, the master node can allocate a portion of the resource of the CPU core to the application. For example, as described above, the portion of the resource of the CPU core can be allocated to the application by, for example, determining a maximum limit of CPU core usage for the application and sending the maximum limit to the computer node when the application is dispatched as a job to the computer node. Optionally, the portion of the resource such as the maximum limit of CPU core usage can be determined based on the CPU capability of the CPU core. In the above example in step 402, if the computer node j with capability $C_j$ is selected to execute the application, the maximum limit of CPU core usage for the application can be determined as the usage required by the application as mentioned above, or can be determined to be slightly larger than the usage required by the application.

Then, in step 406, the master node can re-allocate a new portion of the resource of the CPU core to the application, in response to a trigger event for re-allocation. As one example, the trigger event for re-allocation is an event where a CPU core resource adjustment request for the application is received from the at least one computer node. This example can be implemented as, for example, steps 502-516 in FIG. 5, which will be described below. As another example, the trigger event for re-allocation is an event where monitored CPU core usage for the application received from the at least one compute node satisfies a CPU core resource adjustment condition. The step of checking whether the monitored CPU core usage for the application satisfies the CPU core resource adjustment condition may be implemented in a way similar to steps 302 and 306. The step of re-allocation in response to the monitored CPU core usage satisfying the CPU core resource adjustment condition can be implemented as, for example, steps 506-516 in FIG. 5, which will be described below.

Figure 5:
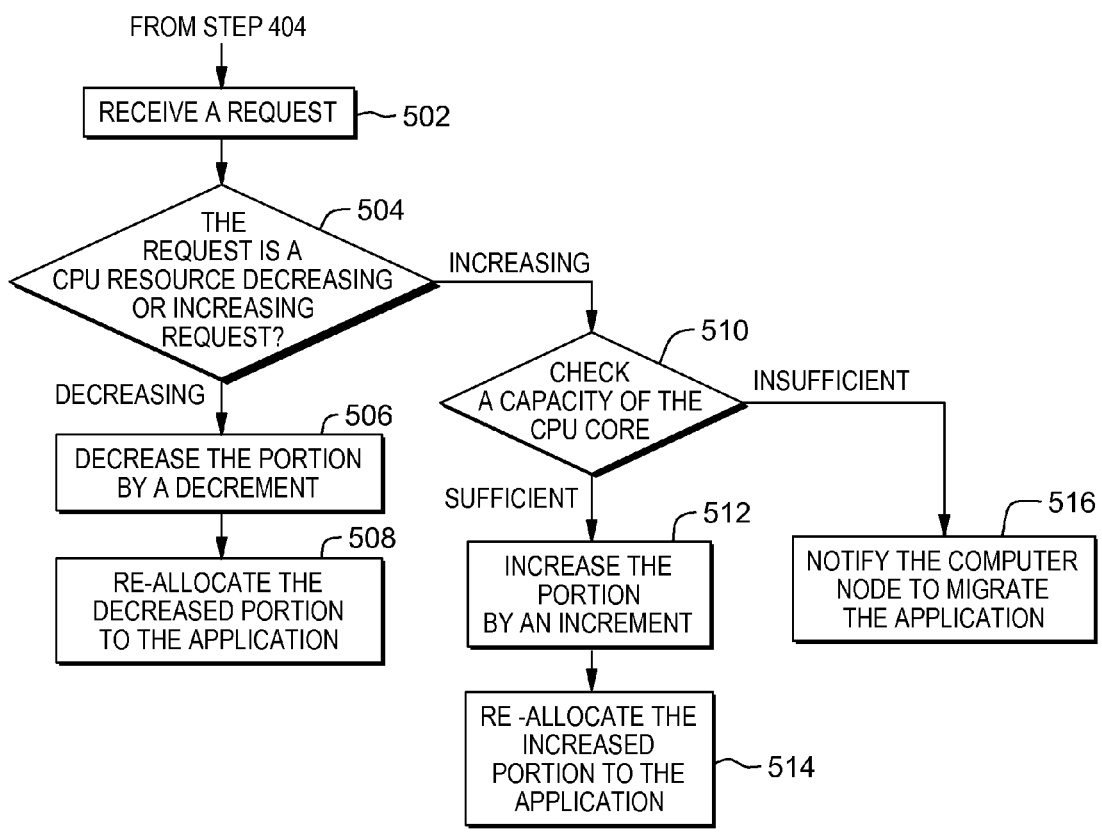
FIG. 5 is a flow chart for explaining the operations in a re-allocation step of FIG. 4, in accordance with an embodiment of the present invention.

FIG. 5 is a flow chart for explaining the operations in a re-allocation step of FIG. 4. In step 502, the master node receives a request. For example, the master node can regularly check whether a request has been received. Then, in step 504, the master node can check whether the request is a CPU core resource decreasing request or a CPU core resource increasing request. If the request is a CPU core resource decreasing request, the master node can decrease the portion of the resource by a fixed or calculated amount (decrement) in step 506. As an example, the master node can decrease the maximum limit of CPU core usage for the application by a calculated amount. The calculated amount can be, for example, the current maximum limit of CPU core usage for the application multiplied by a first predetermined ratio. As described above, the first predetermined ratio can be a unit for decreasing the maximum limit (e.g., 10%), and thus the decreased maximum limit can be determined as the current maximum limit multiplied by a percentage of (1−the first predetermined ratio). Alternatively, it should be noted that the calculated amount can be a fixed value.

Then, in step 508, the master node can re-allocate the decreased portion of the resource to the application. The re-allocation can be implemented by, for example, sending the decreased portion of the resource to the computer node in any suitable manner such as, but not limited to, in an instruction, in a message, etc.

On the other hand, if the request is a CPU core resource increasing request, the master node can check whether a capacity of the CPU core is sufficient for an increment in step 510. The increment can be, for example, a calculated amount of the current maximum limit of the CPU core usage for the application multiplied by a second predetermined ratio. The second predetermined ratio can be a unit for increasing the maximum limit (e.g., 10%). Alternatively, it should be noted the calculated amount can be a fixed value. The CPU capacity of the computer node can be determined as, for example, a remaining percentage of 100% minus a sum of the maximum limits that have been determined for all the applications executed on the computer node. The master node can check whether the remaining percentage is higher than the current maximum limit multiplied by the second predetermined ratio.

If the check result in step 510 is positive (i.e., the capacity of the CPU core is sufficient for the increment), the master node can increase the portion of the resource by the increment. As an example, the master node can increase the maximum limit of CPU core usage for the application by the increment. In a case where the increment is the current maximum limit of CPU core usage for the application multiplied by the second predetermined ratio, the increased maximum limit can be determined as the current maximum limit multiplied by a percentage of 100% plus the second predetermined ratio. Then, in step 514, the master node can re-allocate the increased portion of the resource to the application. The re-allocation can be implemented by, for example, sending the increased portion of the resource to the computer node in any suitable manner such as, but not limited to, in an instruction, in a message, etc.

On the other hand, if the check result in step 510 is negative (i.e., the capacity of the CPU core is not sufficient for the increment), the master node can notify the computer node to migrate the application. As an example, the master node can determine another CPU core as a destination for migrating the application, and notify the computer node in any suitable manner such as, but not limited to, in an instruction, in a message, etc. For example, suppose the CPU core requesting adjustment of CPU core resource is CPU core n with a capability $C_n$, and there are CPU cores i (i=1, 2, . . . , m) other than the CPU core n, wherein each CPU core i has a remaining percentage $R_i$ as described in step 510 and a capability $C_i$. Then, the master node can determine the capacity of each CPU core i as $C_i R_i$, and determine a set of CPU cores each of which having a capacity being higher than $C_n$ multiplied by the increased maximum limit, and select one CPU core from the set of CPU cores as the destination for migrating the application.

In the above example where a CPU core resource adjustment request for the application is received from the at least one computer node, the master node can optionally obtain CPU core usage for the application from the computer node, and determine metering information of CPU core usage for the application based on the CPU core usage and the CPU capability of the CPU core. The metering information can indicate the amount of CPU resource used by an application. As described above, the CPU core usage can be obtained regularly (e.g., in a period of a second or more frequently). The metering information can be determined as, for example, the CPU core usage multiplied by the CPU capability of the CPU core. In a case where the master node does not obtain CPU core usage for the application from the computer node, the metering information can be determined based on the maximum limit of CPU core usage determined for an application.

Figure 6:
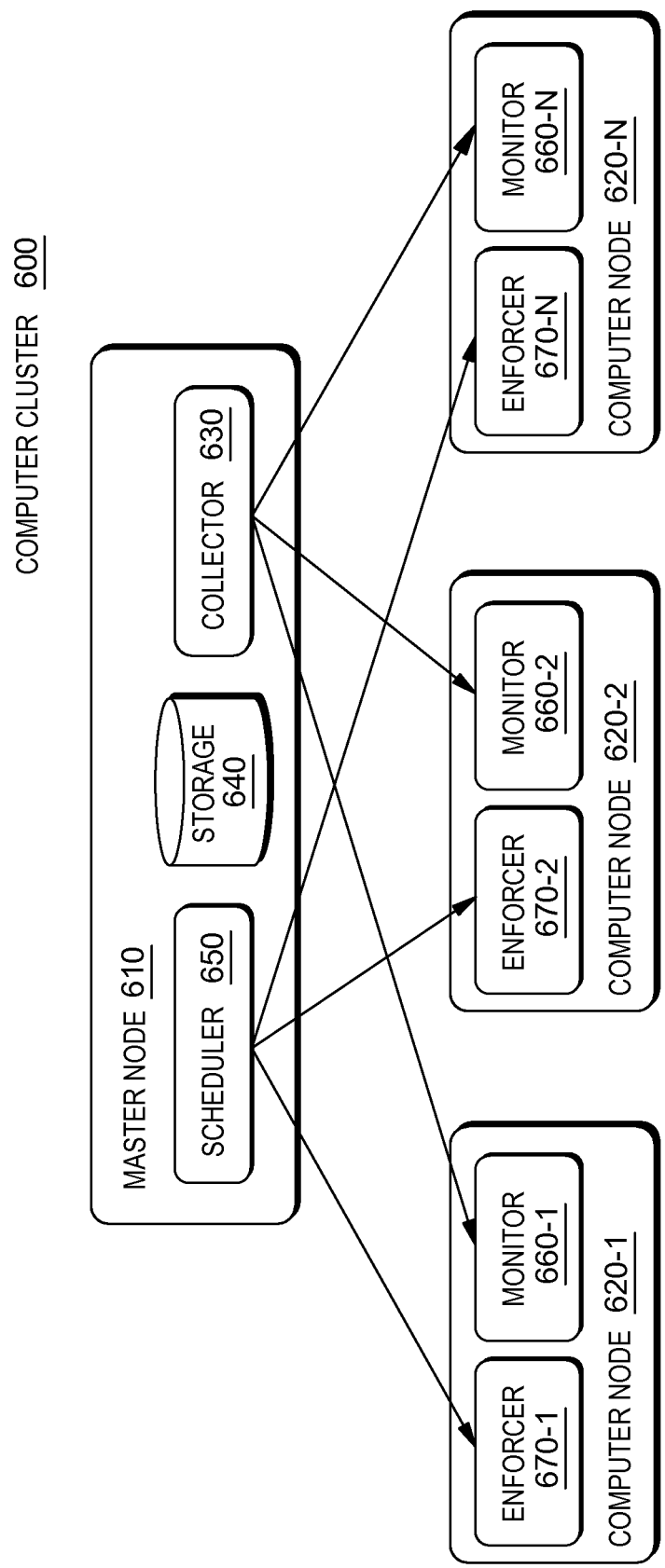
FIG. 6 is a block diagram showing an exemplary computer cluster into which a method, in accordance with an embodiment of the present invention.

FIG. 6 is a block diagram showing an exemplary computer cluster into which a method according to an embodiment of the present invention can be applied. As shown, a computer cluster 600 can comprise a master node 610 and a computer node or computer nodes 620. The computer node 620 can comprise a monitor 660 and an enforcer 670. The monitor 660 can be configured to execute step 204 and part of step 206 in FIG. 2 and steps 302, 304, 306 and 308 in FIG. 3.

The monitor 660 can optionally send the monitored CPU core usage for the application to the master node 610. Further, optionally, when a benchmark program is executed on a computer node 620, the monitor 660 can measure at least one parameter (e.g., the time required for execution of the benchmark program) and use the at least one parameter to determine a rating such as, but not limited to, the CPU capability, and send the CPU capability to the master node 610.

When an application is executed on the computer node 620, the enforcer 670 can enforce, for the application, a maximum limit of CPU core usage determined by the master node 610. The enforcer 670 can be configured to execute step 208 and part of step 206 in FIG. 2 and steps 310, 312, 314 and 316 in FIG. 3.

Optionally, when a benchmark program is executed on the computer node 620, the enforcer 670 can enforce, for the benchmark program, a 100% maximum limit of CPU core usage for each CPU core of the computer node 620.

As shown, the master node 610 can comprise a collector 630, a storage 640 and a scheduler 650. The collector 630 can receive from a computer node 620 a CPU core resource adjustment request, and send the request toward the scheduler 650. Optionally, the collector 630 can receive from each computer node 620, CPU core usage for each application executed on the computer node 620, and store it on the storage 640. The collector 630 can further, optionally, receive a CPU capability from each computer node 620, and store it on the storage 640. The collector 630 can further, optionally, determine metering information for each application executed on the computer node 620 based on the CPU core usage information for the application and the CPU capability of the CPU core of the computer node 620, and store it on the storage 640.

The storage 640 can store, for each application executed on each computer node 620, a maximum limit of CPU core usage determined by the scheduler 650. The storage 640 can optionally store CPU core usage for each application executed on each computer node 620. The storage 640 can further optionally store a CPU capability of each computer node 620. The storage 640 can further, optionally, store the metering information for each application executed on the computer node 620. The storage 640 can be implemented by using any storage device and any storage technologies. Further, the scheduler 650 can be configured to execute steps 402-406 in FIG. 4 and steps 504-516 in FIG. 5.

Based on the above description, the following advantageous technical effects can be achieved in the present disclosure. Because the CPU resource in a CPU core for an application can be dynamically adjusted, the elasticity characteristic of Cloud can be enhanced. Further, because the metering information for an application can be generated based on actual CPU usage from regular monitoring and CPU capability determined in a unified manner, the "charge back" characteristic of Cloud can be enhanced.

The present invention can be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for allocating computer resources, the computer-implemented method comprising:
    selecting, by a master node, a CPU core of at least one computer node from a Linux computer cluster, for an application;
    obtaining a CPU capability for each CPU core of the Linux computer cluster wherein the CPU capability is determined by the at least one computer node based on executing a benchmark program on the CPU core, measuring at least one parameter for the benchmark program, and calculating a rating as the CPU capability of the CPU core based on the at least one parameter;
    allocating, by the master node, a first portion of a resource of the CPU core to the application based on a Cgroup, the CPU capability of the CPU core and a sub-core level; and
    in response to receiving, by the master node, a trigger event for re-allocation, re-allocating, by the master node, the first portion of the resource of the CPU core to a second portion of the resource of the CPU core to the application based on a Cgroup.

2. The method according to claim 1, wherein the trigger event for the re-allocation is at least one of an event where a CPU core resource adjustment request for the application is received, by the master node, from the at least one computer node and an event where a monitored CPU core usage for the application is received, by the master node, from the at least one computer node satisfies a CPU core resource adjustment condition.

3. The method according to claim 2, wherein re-allocating the first portion of the resource to the application comprises:
    in response to receiving, by the master node, a CPU core resource decreasing request or in response to the monitored CPU core usage being less than or equal to a first threshold, decreasing, by the master node, the first portion of the resource by a calculated amount to create the second portion; and
    re-allocating the second portion of the resource to the application.

4. The method according to claim 2, wherein re-allocating the second portion of the resource to the application comprises:
    in response to receiving, by the master node, a CPU core resource increasing request or in response to the monitored CPU core usage for the application being greater than or equal to a second threshold, determining, by the master node, whether a capacity of the CPU core is sufficient for an increase of a calculated amount;
    in response to determining the capacity of the CPU core is sufficient, increasing the first portion of the resource by the calculated amount to create the second portion and re-allocating the second portion of the resource to the application; and
    in response to determining the capacity of the CPU core is not sufficient, notifying the at least one computer node to migrate the application.

5. The method according to claim 1, further comprising: determining metering information of CPU core usage for the application based on the CPU capability of the CPU core.

6. A system comprising:
    one or more processors;
    a memory coupled to at least one of the processors;
    a set of computer program instructions stored in the memory and executed by at least one of the processors in order to perform actions of:
        selecting a CPU core of at least one computer node from a Linux computer cluster for an application;
        obtaining a CPU capability for each CPU core of the Linux computer cluster wherein the CPU capability is determined by the at least one computer node based on executing a benchmark program on the CPU core, measuring at least one parameter for the benchmark program, and calculating a rating as the CPU capability of the CPU core based on the at least one parameter;
        allocating a first portion of a resource of the CPU core to the application based on a Cgroup, the CPU capability of the CPU core and a sub-core level; and in response to a trigger event for re-allocation, re-allocating the first portion of the resource of the CPU core to a second portion of the resource of the CPU core to the application based on a Cgroup.

7. The system according to claim 6, wherein the trigger event for the re-allocation is at least one of an event where a CPU core resource adjustment request for the application is received from the at least one compute node and an event where a monitored CPU core usage for the application is received from the at least one compute node satisfies a CPU core resource adjustment condition.

8. The system according to claim 7, wherein the set of computer program instructions are executed by at least one of the processors in order to perform the action of re-allocating the first portion of the resource to the application by:
   in response to a CPU core resource decreasing request or in response to the monitored CPU core usage for the application being less than or equal to a first threshold, decreasing the first portion of the resource by a calculated amount to create the second portion; and
   re-allocating the second portion of the resource to the application.

9. The system according to claim 7, wherein the set of computer program instructions are executed by at least one of the processors in order to perform the action of re-allocating the second portion of the resource to the application by:
   in response to a CPU core resource increasing request or in response to the monitored CPU core usage for the application being greater than or equal to a second threshold, determining whether a capacity of the CPU core is sufficient for an increase of a calculated amount;
   in response to determining the capacity of the CPU core is sufficient, increasing the portion of the resource by the calculated amount to create the second portion and re-allocating the second portion of the resource to the application; and
   in response to determining the capacity of the CPU core is not sufficient, notifying the at least one computer node to migrate the application.

10. The system according to claim 6, wherein the set of computer program instructions are executed by at least one of the processors in order to further perform actions of:
    determining metering information of CPU core usage for the application based on the CPU capability of the CPU core.

11. A computer program product, comprising a computer readable storage medium having program instructions embodied thereon, the program instructions executable by a master node to cause the master node to:
    select a CPU core of at least one compute node from a Linux computer cluster for an application;
    obtain a CPU capability for each CPU core of the Linux computer cluster wherein the CPU capability is determined by the at least one computer node based on executing a benchmark program on the CPU core, measuring at least one parameter for the benchmark program, and calculating a rating as the CPU capability of the CPU core based on the at least one parameter;
    allocate a first portion of a resource of the CPU core to the application based on a Cgroup, the CPU capability of the CPU core and a sub-core level; and
    in response to a trigger event for re-allocation, re-allocate the first portion of the resource of the CPU core to a second portion of the resource of the CPU core to the application based on a Cgroup.

12. The computer program product according to claim 11, wherein the trigger event for the re-allocation is at least one of an event where a CPU core resource adjustment request for the application is received from the at least one compute node and an event where a monitored CPU core usage for the application is received from the at least one compute node satisfies a CPU core resource adjustment condition.

13. The computer program product according to claim 12, wherein the program instructions are executable by the master node to cause the master node to re-allocate the first portion of the resource to the application by:
    in response to a CPU core resource decreasing request or in response to the monitored CPU core usage for the application being less than or equal to a first threshold, decreasing the portion of the resource by a calculated amount to create the second portion; and
    re-allocating the second portion of the resource to the application.

14. The computer program product according to claim 12, wherein the program instructions are executable by the master node to cause the master node to re-allocate the second portion of the resource to the application by:
    in response to a CPU core resource increasing request or in response to the monitored CPU core usage for the application being greater than or equal to a second threshold, determining whether a capacity of the CPU core is sufficient for a calculated amount;
    in response to determining the capacity of the CPU core is sufficient, increasing the portion of the resource by the calculated amount to create the second portion and re-allocating the second portion of the resource to the application; and
    in response to determining the capacity of the CPU core is not sufficient, notifying the at least one computer node to migrate the application.

15. The computer program product according to claim 11, wherein the program instructions are executable by the master node to further cause the master node to:
    determine metering information of CPU core usage for the application based on the CPU capability of the CPU core.

* * * * *